United States Patent [19]

Spencer

[11] Patent Number: 5,557,756
[45] Date of Patent: Sep. 17, 1996

[54] CHAINED ARBITRATION

[75] Inventor: Thomas V. Spencer, Ft. Collins, Colo.

[73] Assignee: Hewlett-Packard Company, Palo Alto, Calif.

[21] Appl. No.: 331,312

[22] Filed: Oct. 28, 1994

[51] Int. Cl.⁶ .................................................. G06F 13/368
[52] U.S. Cl. ............................ 395/299; 395/730; 395/848
[58] Field of Search ...................................... 395/293, 848, 395/842, 296, 299, 729, 730

[56] References Cited

U.S. PATENT DOCUMENTS

| | | | |
|---|---|---|---|
| 4,641,266 | 2/1987 | Walsh | 395/291 |
| 4,779,089 | 10/1988 | Theus | 395/301 X |
| 5,168,568 | 12/1992 | Thayer et al. | 395/305 |
| 5,179,705 | 1/1993 | Kent | 395/729 |
| 5,301,282 | 4/1994 | Amini et al. | 395/293 |
| 5,381,538 | 1/1995 | Amini et al. | 395/483 |

*Primary Examiner*—Jack B. Harvey
*Assistant Examiner*—Glenn A. Auve

[57] ABSTRACT

A bus arbitration circuit, having a state machine which receives a processor request signal, a request signal from each of a group of internal input/output devices, and an external device request signal. The state machine sends a processor grant signal, a grant signal to one of the internal devices, or a grant signal to the external device, as each of the devices receives control of the bus. The circuit has a signal inverter connected to the processor request signal and another signal inverter connected to the processor grant signal. A control signal controls whether or not the inverters invert the signals. When multiple arbitration circuits are cascaded, the processor request and grant signals are not inverted for the primary bus arbitration circuit, but the request and grant signals are inverted for all secondary bus arbitration circuits.

3 Claims, 6 Drawing Sheets

CHAINED ARBITRATION

FIELD OF THE INVENTION

This invention relates to computer systems and more particularly to peripheral device direct memory access in such computer systems. Even more particularly, the invention relates to determining a priority of which device becomes bus master to perform a direct memory access operation.

BACKGROUND OF THE INVENTION

There are traditionally two basic types of input/output (I/O) used within computer systems—interrupt driven and direct memory access (DMA). Each of these types of I/O has its advantages and disadvantages, both in terms of performance and cost. Interrupt driven I/O interrupts the main processor each time some amount of data is ready to be transferred, and device driver software running in the processor performs the data transfer, so the processor is always in control of the I/O bus. With DMA I/O, the peripheral device becomes the bus master for the computer system I/O bus and performs data transfer directly into or out of the computer system memory. The peripheral device may obtain the bus, transfer some data, and give up the bus many times during a complete I/O operation. At any time many I/O devices, as well as the processor, may want to become the bus master, so an arbitration method is always needed to select one of the devices as the bus master.

A typical central bus arbitration scheme consists of an arbitration circuit with a grant and request signal for each bus device capable of mastering a transaction on the bus. That is, for each bus device that is capable of becoming a bus master device. This methods works well, but it requires the arbitration circuit to anticipate all future expansion on the bus and provide arbitration signals to support that expansion, thus it requires signals for each device that may ever be connected to the bus. This adds cost to the circuit by forcing it to support arbitration signals that are not necessary in an entry level configuration of the circuit. It also adds cost by increasing the size and complexity of the arbitration circuit and using extra integrated circuit pins unnecessarily. This traditional method also runs the risk of underestimating the future expansion needs so it may limit the ability to meet future requirements.

The IBM personal computer uses the Intel 8237A DMA chip to implement the bus arbitration method for the personal computer bus, and to perform the direct memory access I/O operation for a device. The 8237A chip has four DMA channels, each of which can perform DMA I/O for a peripheral device. In addition, through cascading, separate 8237A chips can be connected to the original 8237A chip to allow expansion up to many devices. Thus, in the smallest entry level system, four different devices are allowed to become bus master, when perhaps only one or two will actually use that capability. Further, the cascading mechanism occupies one of the DMA channels for each cascaded DMA chip, and the DMA channel used for the cascaded DMA chip must be specially programmed to recognize that it is being used for cascading. This places additional limits on the software of the computer system, and requires that the software be specially configured for each different DMA configuration for a computer system. Thus, as in the system described above, this system suffers from adding cost to entry level machines, while placing software limitations and requirements on the computer system.

There is need in the art then for a system that provides for a very small number of devices that can become bus masters to accommodate entry level machines, while having unlimited expandability for fully implemented machines. There is a further need for such a system that requires no programming to implement cascading of the bus arbitration circuit. The present invention meets these and other needs in the art.

SUMMARY OF THE INVENTION

It is an aspect of the present invention to provide a system bus arbitration apparatus and method within a computer system.

Another aspect of the invention is to provide such an arbitration system that allows unlimited expandability.

Yet another aspect of the invention is to provide a system that uses a circuit to provide arbitration for a group of devices and also uses the same circuit for providing arbitration for multiple groups of devices.

Still another aspect of the invention is that the arbitration circuit is not required to be programmed in order to cascade the arbitration circuit for unlimited expandability.

A further aspect of the invention is that the arbitration circuit is adaptable to interface to a processor or to another arbitration circuit.

A still further aspect is that when no I/O device is requesting the bus, the system automatically makes the processor the bus master.

The above and other aspects of the present invention are accomplished in a bus arbitration circuit for determining which device controls a bus within a computer system. The circuit has a state machine which receives a processor bus master request signal from a processor device, a bus master request signal from each of a group of internal input/output devices, and an external device request signal from an external device. The state machine sends a processor grant signal to the processor device, or a grant signal to one of the internal input/output devices, or a grant signal to the external device, as each of the devices receives control of the computer system bus.

The circuit also has a signal inverter device connected to the processor request signal and another signal inverter connected to the processor grant signal. A control signal controls whether or not the inverter devices invert the processor request and processor grant signals. The processor request and grant signals are not inverted when the bus arbitration circuit is assigned as a primary circuit, wherein it is connected directly to the processor, but the request and grant signals are inverted when the bus arbitration circuit is assigned as a secondary circuit, wherein it is connected to another arbitration circuit.

Multiple arbitration circuits can be cascaded, to arbitrate any number of devices, by connecting the processor grant signal of a lower priority bus arbitration circuit to the external device request signal of a higher priority bus arbitration circuit, and by connecting the external device grant signal of a higher priority bus arbitration circuit to the processor request signal of a lower priority bus arbitration circuit. The control signal of the first bus arbitration circuit, that is the bus arbitration circuit connected directly to the processor, is set to cause it to be a primary arbitration circuit, and the control signal of all the other bus arbitration circuits is set to cause them to be secondary arbitration circuits.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
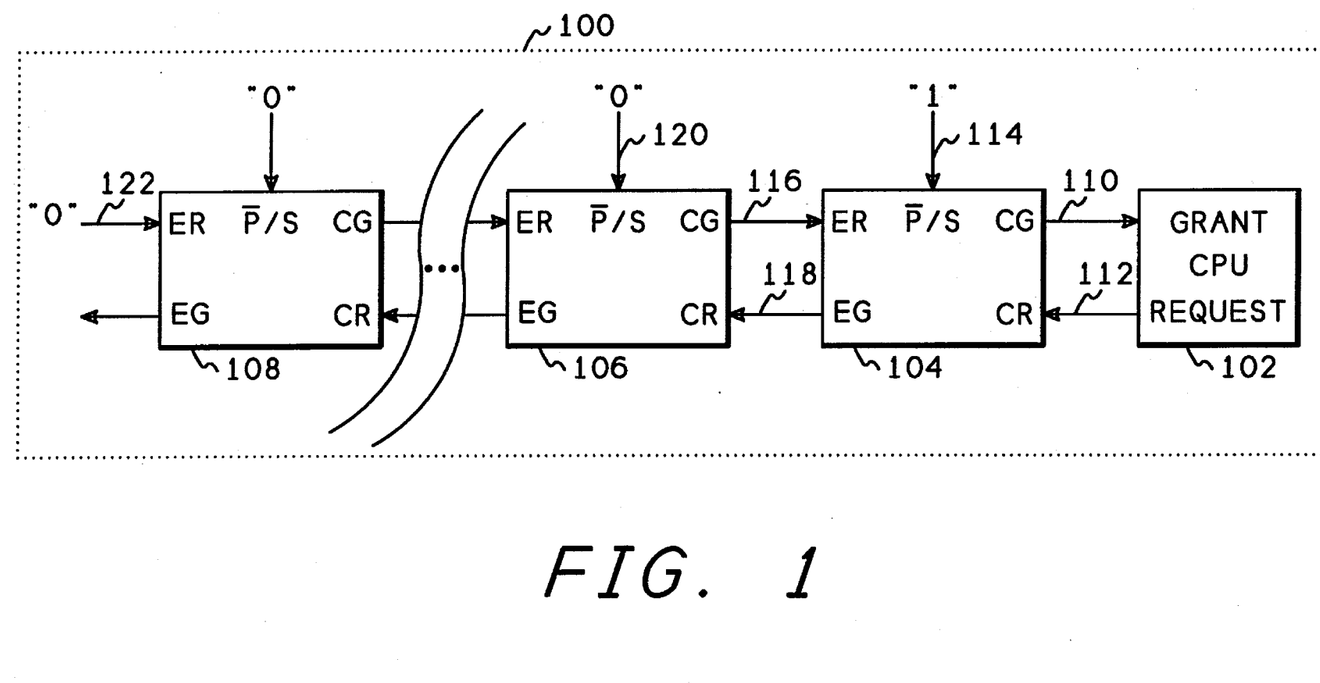
FIG. 1 shows several sets of the arbitration circuit of the present invention as the circuit is connected in a computer system.

FIG. 1 shows a diagram that includes several sets of the arbitration circuit of the present invention, as the arbitration circuit would be connected in a computer system. Referring now to FIG. 1, the arbitration circuit 104, of the present invention, is connected to a CPU 102 through a CPU grant signal (CG) 110 and a CPU request signal (CR) 112. These two signals control bus arbitration between the arbitration circuit 104, which is the primary arbitration circuit, and the CPU 102. In addition, other arbitration circuits 106 and 108 are connected as secondary arbitration circuits. The P/S signal input to the arbitration circuit determines whether the circuit is acting as a primary arbitration circuit or a secondary arbitration circuit. In FIG. 1, the P/S signal 114 connected to the arbitration circuit 104 is set to cause the arbitration circuit 104 to be a primary arbitration circuit. The P/S signal 120 of arbitration circuit 106 is connected to cause it to be a secondary arbitration circuit. As shown in FIG. 1, an unlimited number of secondary arbitration circuits can be connected to a primary arbitration circuit. The last secondary arbitration circuit, in this example arbitration circuit 108, has its external request signal 122 set to prevent the external request (ER) signal from ever being activated. In this example, the last ER signal is grounded. The external request and external grant signals are used between a primary arbitration circuit and a secondary arbitration circuit, or between secondary arbitration circuits, to control bus arbitration across multiple arbitration circuits.

Figure 2:
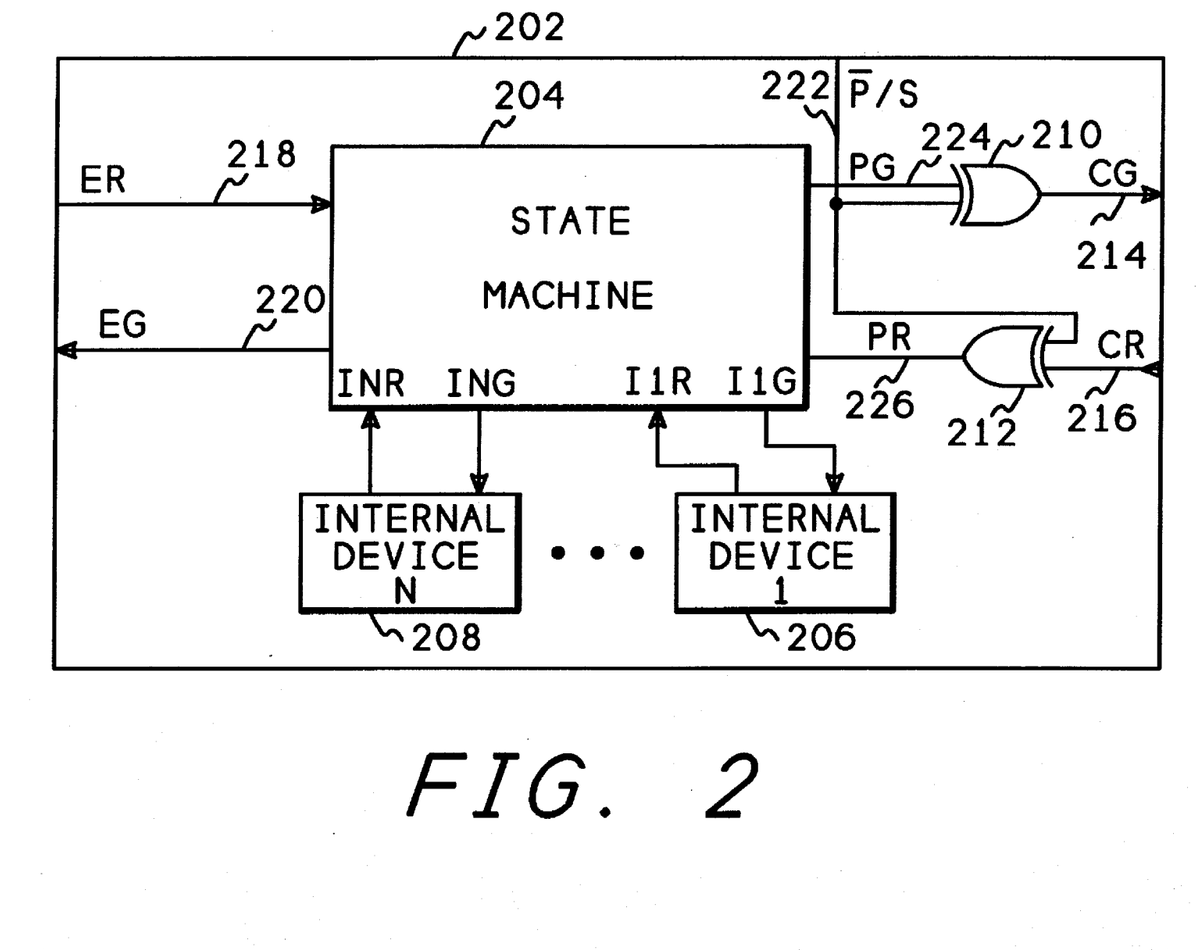
FIG. 2 shows a block diagram of the arbitration circuit.

FIG. 2 shows a block diagram of the arbitration circuit of the present invention. Referring now to FIG. 2, the arbitration circuit 202, which is used for the circuits 104, 106, and 108, contains a state machine 204, which will be described below with respect to FIG. 7. The state machine outputs a processor grant signal (PG) 224 which is then exclusive ORed with the P/S signal 222 and becomes the CPU grant signal (CG) 214 which is shown in FIG. 1 as signals 110 and 116. CPU request signal (CR) 216, shown in FIG. 1 as signals 112 and 118, is exclusive ORed with the P/S signal 222 to become a processor request signal (PR) 226. The exclusive OR circuits 210 and 212, along with the P/S signal 222, are used to invert the PG and PR signals when the arbitration circuit 202 is acting as a secondary arbitration circuit, and P/S is held at a high, or logic one, value, and to not invert the PG and PR signals when the arbitration circuit 202 is acting as a primary arbitration circuit, when the P/S signal is held at a low, or logic zero, value. This connection of signals allows the arbitration circuit 202 to act as either a primary or a secondary arbitration circuit, depending upon how the P/S signal is connected.

A number of internal devices, here shown as internal device 1 206 through internal device N 208 are connected to the state machine 204, wherein each of the internal devices has a corresponding internal grant and internal request signal. In addition, the state machine accepts an external request signal 218 and outputs an external grant signal 220, all of which will be described below with respect to FIG. 7.

Figure 3:
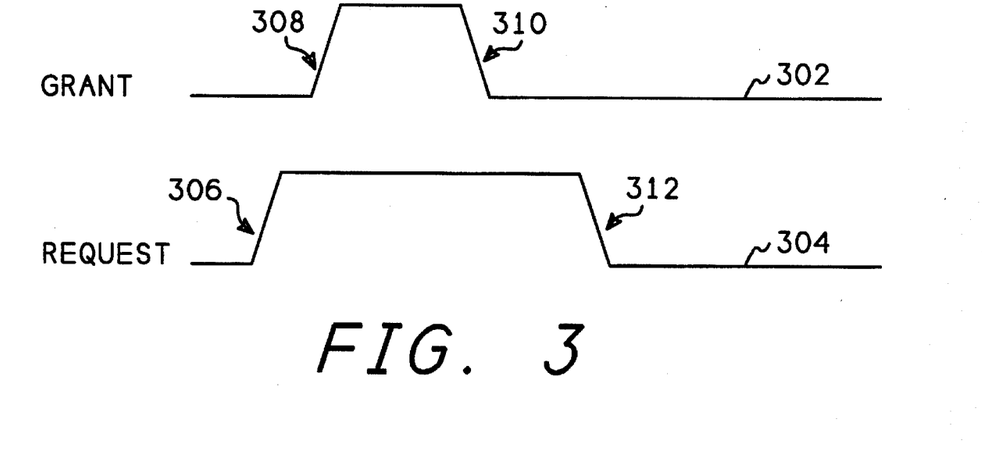
FIG. 3 sows a timing diagram of the request and grant signals of the circuit.

FIG. 3 shows a timing diagram of the request and grant signals used in the circuit. Referring now to FIG. 3, when a device wants to become bus master, it raises its request signal 304 at rising edge 306. The high level request signal is detected by the state machine 204 which after any higher priority devices have given up the bus, the state machine 204 raises the grant signal for the device, at rising edge 308, indicating that the device that made the request has been granted the bus. The device then uses the bus for as long as it needs, at which time it may voluntarily give up the bus by dropping its request signal. If another device wants to use the bus while the first device is bus master, the state machine 204 will drop the grant line 302, at falling edge 310, to signal the device that is currently bus master that another device wishes to have control of the bus. After the device that is currently bus master has completed its operations, it drops the request line to give up the bus.

Thus, the sequence for requesting the bus is that a device raises its request signal when it needs the bus. The device becomes bus master when its grant signal is raised by the state machine, and the device remains bus master as long as it keeps its request signal high, regardless of what the state machine does to its grant signal. The state machine drops the device's grant signal as a request to the device to give up being bus master. The device gives up the bus when it drops its request signal.

Figure 4:
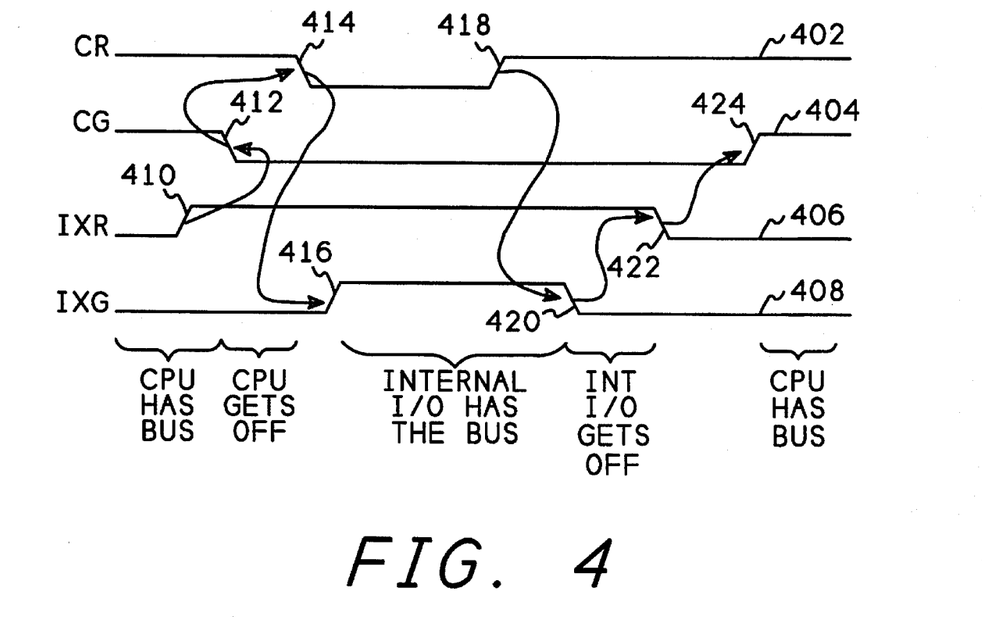
FIG. 4 shows a timing diagram of the sequence of exchanging bus master between the processor and an I/O device.

FIG. 4 shows a timing diagram of the sequence of exchanging bus master between the processor and an I/O device. When no I/O device is requesting the bus, the bus is automatically given to the CPU so that the CPU is bus master unless some other device is requesting to become bus master. In the timing diagram of FIG. 4, initially the CPU is bus master.

Because the CPU is bus master, the CR line is high and the CG line is high on the left side of the diagram. When a device, arbitrarily identified as device "X", wishes to control the bus, it raises its internal request line IXR which at rising edge 410. The raising of IXR causes the state machine 204 to drop the CG line which at falling edge 412. When the CG line is dropped, the arbitration circuit requests that the CPU give up control of the bus. When the CPU does give up control, it drops the CR line at falling edge 414 to indicate that it is no longer bus master. The state machine 204 then raises the IXG line, which is the grant line for the circuit that requested to be bus master, at rising edge 416, which makes the device the bus master. The internal device remains bus master for some period of time and at some time, in this example, the CPU requests that it again become bus master by raising the CR line at rising edge 418. The rising edge 418 causes the state machine 204 to drop the IXG line at falling edge 420. Once the grant line has been dropped, the internal device is requested to give up control of the bus and it does so by dropping the IXR line at falling edge 422. Once the internal device has given up the bus by dropping the IXR line, the state machine 204 gives control of the bus back to the CPU by raising the CG line at rising edge 424.

Figure 5:
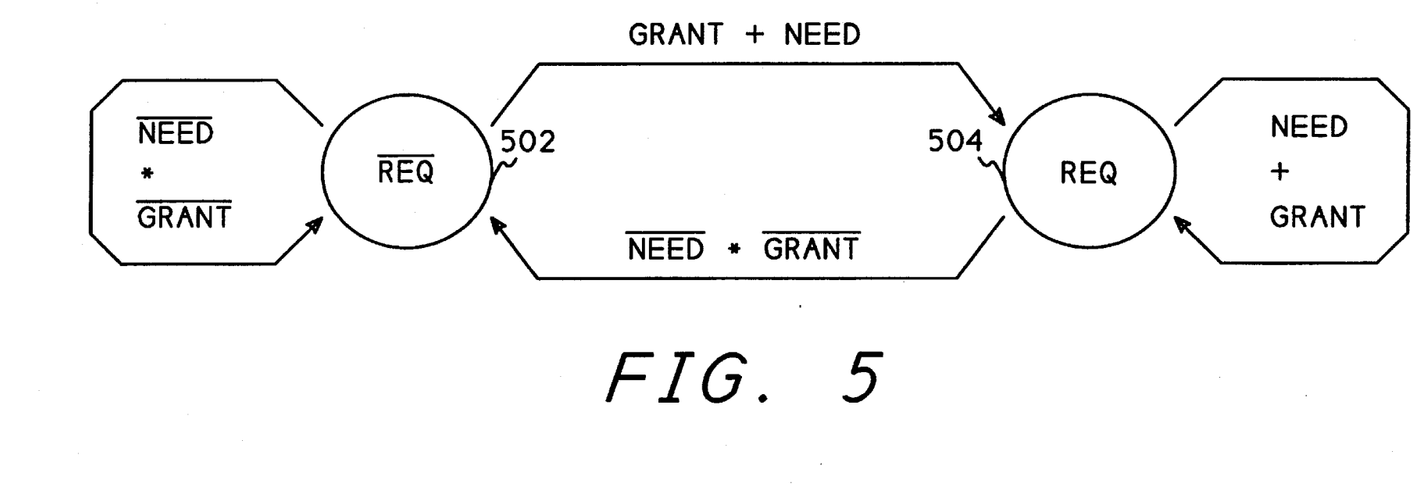
FIG. 5 shows a state diagram of the processor states used in determining bus master.

FIG. 5 shows a state diagram used by the processor to control access to the bus and to obtain bus master. Referring now to FIG. 5, if the processor does not currently have a need to be bus master, and the grant line (CG) is not up, the processor will stay in state 502 keeping its request line (CR) down. Thus, in this state some other device is bus master.

If the processor needs to become bus master, the NEED signal causes the state machine to go to state 504 where the request line (CR) is raised. Also, if no other device is bus master and the processor is automatically granted bus master status when the arbitration circuit raises the CPU grant line (CG), control also transfers to state 504 where the processor raises the request line indicating that it is bus master. The processor will stay in state 504 as long as it has a need for the bus, wherein the NEED signal remains high, or as long as the grant line remains high.

If the grant line (CG) is taken to a low signal level by the arbitration circuit, thus indicating that some other device wishes to become bus master, and the processor no longer has a need for the bus, then state 504 transfers back to state 502 which drops the request line (CR) indicating that the processor is giving up control of the bus.

Figure 6:
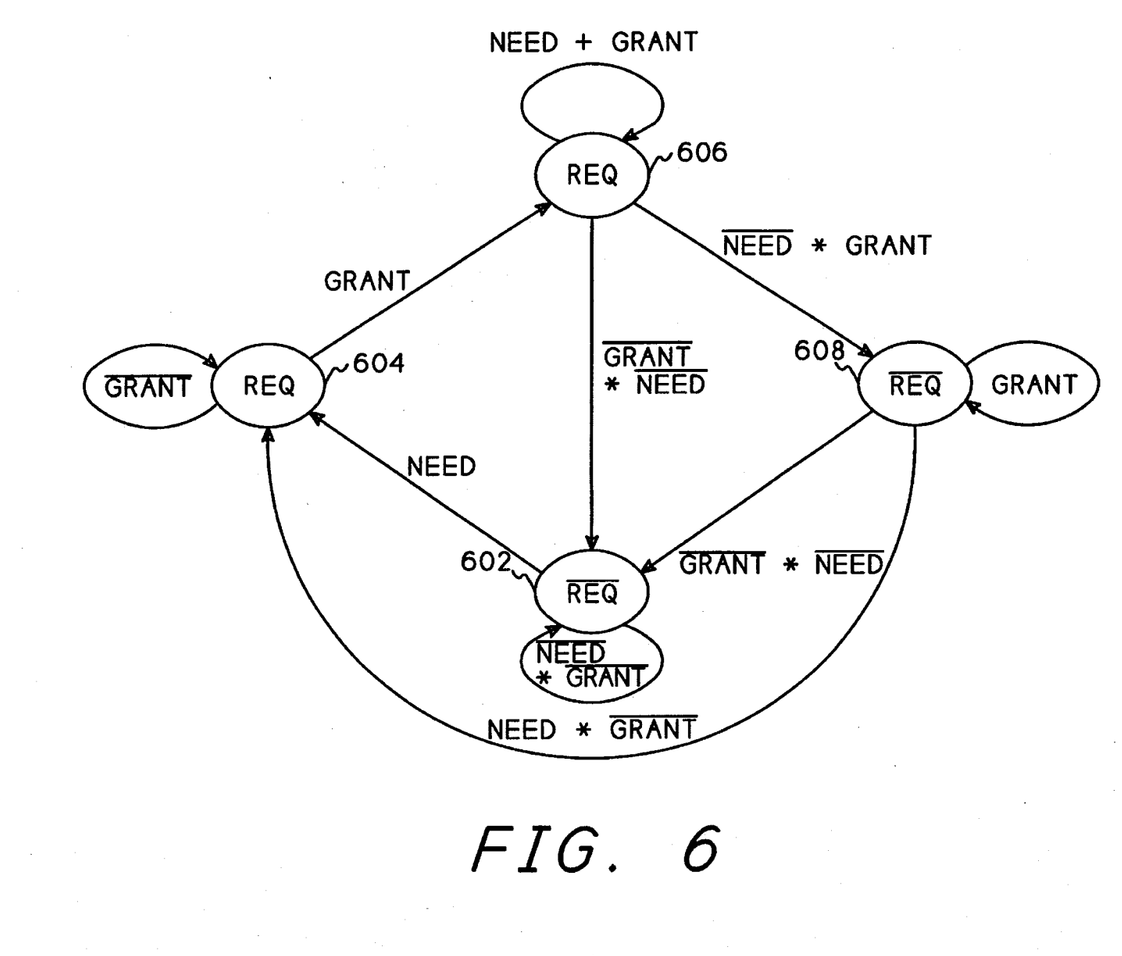
FIG. 6 shows a state diagram of the states using determining bus master in an I/O device.

FIG. 6 shows a state diagram of the state machine used by an I/O device to obtain and manage control of the bus. Referring now to FIG. 6, an I/O device normally stays in state 602, with the request line down, as long as there is no need for the bus. When the device has a need to become bus master, state 602 transfers to state 604 raising the request line from the device to the arbitration circuit. The device stays in state 604 while the grant line remains low, but as soon as grant is raised, state 604 transfers to state 606 causing the I/O device to become bus master. The I/O device stays in state 606 as long as grant remains up or the device still needs the bus to complete its operation. When the device no longer needs the bus, if grant has been previously removed, state 606 transfers directly back to state 602 to drop request and give up the bus. If the device no longer needs the bus, but grant is still high, state 606 transfers to state 608 which drops the request line. The device remains in state 608 as long as the grant line stays high. If the grant line drops, and there is still no additional need for the bus, state 608 transfers back to state 602 to wait until a need exists. If a new need for the bus arises while in state 608, state 608 transfers to state 604 as soon as grant drops, to raise the request line again and request the bus a second time.

Figure 7:
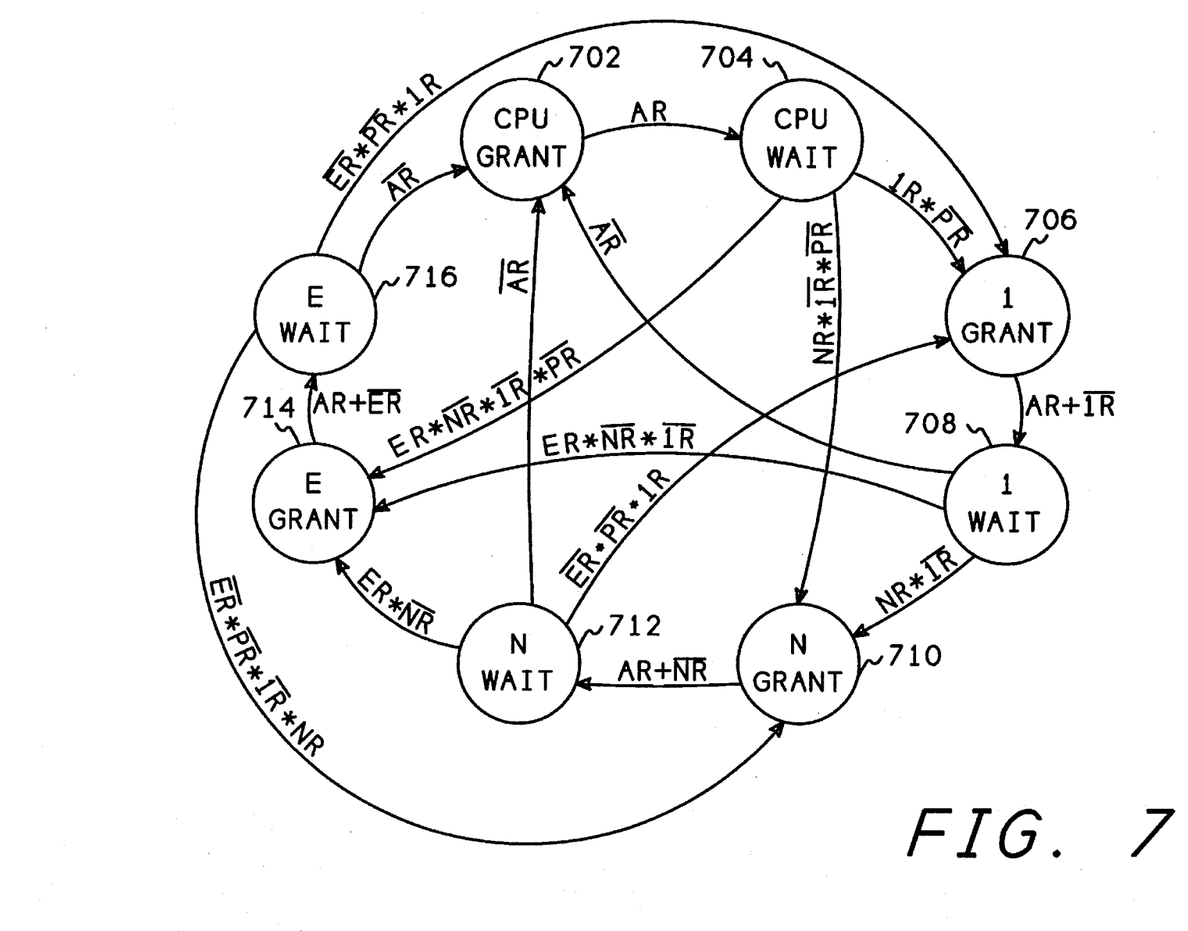
FIG. 7 shows a state diagram of the arbitration circuit state machine of FIG. 2.

FIG. 7 shows a state diagram of the arbitration circuit state machine 204 of FIG. 2. Referring now to FIG. 7, the idle state, where the state machine remains when no I/O device is requesting the bus, is state 702. In this state, the state machine raises the PG signal 224, giving up control of the bus. This action either raises the CG signal 214 which gives bus control to the CPU, when this arbitration circuit is performing as a primary arbitration circuit, or drops the external request line (ER) of the next arbitration circuit, when this arbitration circuit is performing as a secondary arbitration circuit.

The signal "AR" means any request from any I/O device, including an external request signal on the ER line 218 (FIG. 2). When any request line is raised, that is, the request line from any internal device or the external device is raised, state 702 transfers to state 704 which drops the PG 224 to request control of the bus. This request for control is accomplished by dropping the CR line to the CPU, when this arbitration circuit is performing as a primary arbitration circuit, or by raising the ER line to the next arbitration circuit, when this arbitration circuit is performing as a secondary arbitration circuit.

The state machine remains in state 704 until the PR line 226 drops, indicating that this arbitration circuit has control of the bus. The PR line will drop when this arbitration circuit is performing as the primary arbitration circuit and the CPU drops the CR line, or when this arbitration circuit is performing as a secondary arbitration circuit, and the arbitration circuit to which it is connected raises the external grant (EG) signal.

With the PR signal down, state 704 transfers to the grant state for the highest priority device that had requested the bus. For example, if device 1 had requested the bus, state 704 will transfer to state 706 regardless of what other devices had requested the bus. If, on the other hand, state N (i.e. the lowest priority internal device in this arbitration circuit) had requested the bus, and no higher priority internal device had requested the bus, the state machine will transfer from state 704 to state 710 to grant the bus to device N, regardless of whether the external request signal is high. If only the external request signal is high, state 704 will transfer to state 714 to raise the external grant signal to the external device.

By was of example, consider the case where device 1 is requesting the bus. In this case, after the PR signal drops, state 704 will transfer to state 706 and raise the internal device 1 grant signal to internal device 1206 (FIG. 2) thus granting bus master status to internal device 1. The state machine will stay in state 706 until another request line from any other device (AR) is raised, or until device 1 drops its request line. When either of these two occur, state 706 will transfer to state 708 to wait until the device 1 drops its request line. If device one had already dropped its request line and no other request lines are high, state 708 will transfer back to state 702 and grant the bus to the CPU. If any device within this arbitration circuit that is a lower priority than device 1 raises its request line, or the external request line is raised, state 708 will transfer either to the grant state for the lower priority device, represented by state 710, or to state 714 if the external request line is high.

In this manner, the state machine grants the bus in a round robin fashion to internal devices 1 through N, and then to the external devices, where the grant will go round robin through external devices in each of the secondary arbitration circuits.

As discussed above, when an arbitration circuit is performing as a secondary arbitration circuit, the P/S signal 222 (FIG. 2) will be low causing exclusive OR circuit 212 to invert the CR signal 216 into the PR signal 226. The result of this is that when the primary arbitration circuit, or the next higher priority secondary arbitration circuit, issues an external grant signal in state 714, it appears to this secondary arbitration circuit that the processor request signal has dropped indicating that the processor has given up the bus. This is the desired behavior, since the primary arbitration circuit, or the next highest priority secondary arbitration circuit, is giving up the bus to this secondary arbitration circuit, which must then grant the bus round robin through its devices. In the same manner, when the secondary arbitration circuit issues the PG signal in state 702, this signal is inverted by exclusive OR circuit 210 and causes the CG signal 214 to go low removing the external request signal (ER) in the primary arbitration device, or in the next higher priority secondary arbitration device. In this manner, an unlimited number of secondary arbitration circuits can be connected through the external request, external grant, CPU grant, and CPU request lines. The only requirement is that the P/S signals be set properly, and the lowest priority secondary arbitration circuit have its external request line tied low, to prevent any possible external request from appearing to the lowest order arbitration circuit.

Also, as shown above in FIG. 7, any number of internal devices can be processed by the state machine of FIG. 7. Although the state machine of FIG. 7 shows only internal devices one and N, those skilled in the art will recognize that it can easily be extended to an arbitrary number of internal devices.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A bus arbitration circuit for determining which device controls a bus within a computer system, said circuit comprising:

a state machine for receiving a processor request signal from a processor device, a request signal from one or more input/output devices, and an external device request signal from an external device, and for sending a processor grant signal to said processor device, a grant signal to each of said one or more input/output devices, and an external device grant signal to said external device as each of said devices receives control of said bus;

a first inverter device connected to a signal line carrying said processor request signal and further connected to a signal line carrying a control signal wherein said first inverter device does not invert said processor request signal when said control signal has a first signal level and wherein said first inverter device inverts said processor request signal when said control signal has a second signal level, wherein said bus arbitration circuit is assigned as a primary circuit when said control signal is at said first signal level and wherein said bus arbitration circuit is assigned as a secondary circuit when said control signal is at said second signal level;

a second inverter device connected to a signal line carrying said processor grant signal and further connected to a signal line carrying said control signal wherein said second inverter device does not invert said processor grant signal when said control signal has said first signal level and wherein said second inverter device inverts said processor grant signal when said control signal has said second signal level.

2. The bus arbitration circuit of claim 1 wherein a second bus arbitration circuit is connected to said bus arbitration circuit by connecting a signal line carrying a processor grant signal of said second bus arbitration circuit to a signal line carrying said external device request signal of said bus arbitration circuit and connecting a signal line carrying said external device grant signal of said bus arbitration circuit to a signal line carrying a processor request signal of said second bus arbitration circuit, and wherein said control signal of said bus arbitration circuit is set to said first signal level and a control signal of said second bus arbitration circuit is set to said second signal level.

3. A bus arbitration system for determining which device controls a bus within a computer system, said circuit comprising:

a plurality of bus arbitration circuits each having a control signal input, a processor request signal input, an external device request signal input, a processor grant signal output and an external device grant signal output, wherein a first of said plurality of circuits has a signal line carrying said processor grant signal and a signal line carrying said processor request signal connected to input signal lines of a processor within said computer system and has a signal line carrying said external device request signal input connected to a signal line carrying said processor grant signal output of a second bus arbitration circuit and has a signal line carrying said external device grant signal output connected to a signal line carrying said processor request signal input of said second circuit, and wherein each other of said plurality of circuits has a signal line carrying said processor grant signal connected to a signal line carrying said external device request signal of a circuit connected next closer to said processor and wherein each other of said plurality of circuits has a signal line carrying said processor request signal connected to a signal line carrying said external grant signal of said circuit connected next closer to said processor, wherein said control signal of said first circuit is connected to have a first signal level and said control signal of all other circuits is connected to have a second signal level, and wherein each of said circuits comprises a state machine for receiving said processor request signal, a request signal from one or more input/output devices, and said external device request signal, and for sending said processor grant signal, a grant signal to each of said one or more input/output devices, and said external device grant signal as each of said devices receives control of said bus;

a first inverter device connected to said signal line carrying said processor request signal and further connected to said signal line carrying said control signal wherein said first inverter does not invert said processor request signal when said control signal has said first signal level and wherein said first inverter inverts said processor request signal when said control signal has said second signal level;

a second inverter device connected to said signal line carrying said processor grant signal and further connected to said signal line carrying said control signal wherein said second inverter does not invert said processor grant signal when said control signal has said first signal level and wherein said second inverter inverts said processor grant signal when said control signal has said second signal level.

\* \* \* \* \*